United States Patent
Feulner

(10) Patent No.: US 6,574,965 B1
(45) Date of Patent: Jun. 10, 2003

(54) ROTOR TIP BLEED IN GAS TURBINE ENGINES

(75) Inventor: Matthew R. Feulner, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 177 days.

(21) Appl. No.: 09/220,468

(22) Filed: Dec. 23, 1998

(51) Int. Cl.$^7$ ................................................ F02C 6/04
(52) U.S. Cl. ............................. 60/785; 60/262; 60/805; 415/168.2
(58) Field of Search ......................... 60/785, 262, 805, 60/39.75; 415/144, 168.1, 168.2, 168.4, 169.1, 914, 173.1, 57.1, 57.3, 57.4, 58.4

(56) References Cited

U.S. PATENT DOCUMENTS

| 2,650,753 A | | 9/1953 | Howard ....................... 230/133 |
| 3,641,766 A | * | 2/1972 | Uehling ....................... 60/39.75 |
| 4,155,680 A | * | 5/1979 | Linko, III et al. ........ 415/169.1 |
| 4,466,772 A | * | 8/1984 | Okapuu et al. ........... 415/173.5 |
| 4,631,914 A | * | 12/1986 | Hines ........................... 60/262 |
| 4,702,070 A | * | 10/1987 | Cureton et al. ............. 60/39.07 |
| 5,203,162 A | * | 4/1993 | Burge .......................... 60/39.07 |
| 5,327,716 A | | 7/1994 | Giffin, III et al. |
| 5,351,478 A | * | 10/1994 | Walker et al. .............. 60/39.07 |
| 5,531,565 A | | 7/1996 | Meindl et al. |
| 5,707,206 A | * | 1/1998 | Goto et al. ................ 415/173.1 |
| 5,918,458 A | * | 7/1999 | Coffinberry et al. ........ 60/39.75 |

FOREIGN PATENT DOCUMENTS

| DE | 2 113 429 | 9/1972 |
| GB | 586710 | 3/1947 |
| GB | 2158879 | 11/1985 |

* cited by examiner

Primary Examiner—Charles G. Freay

(57) ABSTRACT

A gas turbine engine includes a compressor, a combustor, and turbine enclosed in an engine case with the compressor having a plurality of alternating rows of rotating blades and stationary vanes. The gas turbine engine also includes a substantially circumferential groove formed in the engine case of the compressor section. The groove is substantially adjacent to a row of rotating blades to extract a portion of tip leakage flow from that row of blades and to route the extracted tip leakage flow to the turbine section for cooling turbine components. In the preferred embodiment of the present invention, the groove communicates with a plenum which communicates with the turbine section of the gas turbine engine via channeling pipes formed within the engine case.

16 Claims, 5 Drawing Sheets

ROTOR TIP BLEED IN GAS TURBINE ENGINES

BACKGROUND OF THE INVENTION

1. Technical Field

The present invention relates to gas turbine engines and, more particularly, to cooling turbine section components and to reducing the potential for a stall or a surge therefor.

2. Background Art

Conventional gas turbine engines are enclosed in an engine case and include a compressor, a combustor, and a turbine. An annular flow path extends axially through the sections of the engine. As is well known in the art, the compressor includes alternating rows of stationary airfoils (vanes) and rotating airfoils (blades) that apply force to compress the incoming working medium. A portion of the compressed working medium enters the combustor where it is mixed with fuel and burned therein. The products of combustion, or: hot gases, then flow through the turbine. The turbine includes alternating rows, of stationary vanes and rotating blades that extend radially across the annular flow path and expand the hot gases to extract force therefrom. A portion of the extracted energy is used to drive the compressor.

Each airfoil includes a low pressure side (suction side) and a high pressure side (pressure side) extending radially from a root to a tip of the airfoil. To optimize efficiency, the annular flow path for the working medium is defined by an outer shroud and an inner shroud. The outer shroud is typically the engine case disposed radially outward of the outer tips of the rotating blades. A tip clearance is defined between the engine case and the tips of the rotating blades.

One of the major goals in gas turbine engine fabrication is to optimize efficiency and performance, without sacrificing engine stability. In order to optimize the efficiency of the compressor and the turbine it is necessary to ensure that work performed on the working medium is not lost. One factor effecting total efficiency is tip leakage losses. Tip leakage occurs when higher pressure air from the pressure side of the rotor blade leaks to the lower pressure suction side of the blade through the tip clearance. Tip leakage reduces efficiency in two ways. First, work is lost when higher pressure gas escapes through the tip clearance without being operated on in the intended manner by the blade, i.e. for compressors the leakage flow is not adequately compressed and for the turbines the leakage is not adequately expanded. Second, leakage flow from the pressure side produces interference with the suction side flow. The interference results from the leakage flow being misoriented with respect to the suction side flow. The difference in the orientation and velocity of the two flows results in a mixing loss as the two flows merge and eventually become uniform. Both types of losses contribute to reduction in efficiency of the gas turbine engine.

Tip leakage also may result in engine instability, such as a stall or surge. If the tip clearance flow is overly strong and sufficiently penetrates into the incoming flow, the direction of the air flow through the compressor will reverse, degrading performance of that stage and potentially causing a surge. Since engine instability is highly undesirable, particularly in aircraft applications, the problem of tip leakage and instability has been investigated for many years. One solution is to reduce the tip clearances and ensure that the engine is operated well below the surge line. Most current solution attempts to reduce tip: clearance involve actively changing the tip clearance by adjusting the diameter of the engine case liner. However, the active control of the tip clearance requires additional hardware that adds complexity and undesirable weight to the engine. Solutions for improving surge line conditions include engine case treatments or bleeding valves, or both, as disclosed in the U.K. Patent Application GB 2158879: entitled "Preventing Surge in Axial Flow Compressor", published Nov. 20, 1985. The U.K. Patent Application discloses use of both case treatments and a bleed valve for selective bleeding of the compressor air. However, the scheme potentially improves engine stability, but sacrifices performance by wasting the compressor air bled through the bleeding valve.

Another factor that effects gas turbine engine performance is the need to cool certain turbine components. The turbine section of the gas turbine engine is subjected to an extremely harsh environment, characterized by very high temperatures and pressures. The components of the turbine must be cooled to prevent these components from burning in a very short period of time. The cooler air is typically bled from the compressor and routed to the turbine. Although the bled cooling air is necessary to cool turbine components, the loss of the cooling air from the compressor is highly undesirable.

Typically, the cooling air bled from the compressor must have pressure high enough to flow downstream to the turbine, but also to be taken from the compressor stage with the lowest pressure usable for cooling purposes such that no additional work is performed on the air, thereby wasting energy and lowering the gas turbine engine efficiency. In order to ensure that no additional work is performed on the extracted cooling air, other than absolutely necessary, the cooling air is diverted from the compressor before the air enters a blade stage and after the air passes through the vane stage. This is done to prevent the following stages of blades from performing additional work on the air and to raise static pressure of the air as it passes through the vane stage. Thus, the need to divert air from the compressor to cool turbine components reduces the overall engine efficiency, but is necessary for the engine performance.

Therefore, it is desirable to improve stability of the gas turbine engine without sacrificing performance thereof.

SUMMARY OF THE INVENTION

It is an object of the present invention to improve both performance and stability of the gas turbine engine.

According to the present invention, a gas turbine engine having a compressor, a combustor, and turbine enclosed in an engine case with the compressor having a plurality of alternating rows of rotating blades and stationary vanes includes a substantially circumferential groove formed in the engine case of the compressor substantially adjacent to a row of rotating blades to extract a portion of tip leakage flow from that row of blades and to route the extracted tip leakage flow to the turbine section for cooling turbine components. In the preferred embodiment of the present invention, the groove communicates with a plenum which communicates with the turbine section of the gas turbine engine via channeling pipes formed within the engine case. The extracted tip leakage flow reduces the overall tip leakage flow that would otherwise be available to pass from a pressure side of the blade to a suction side and to mix and interfere with the suction side flow.

The reduction in tip leakage optimizes both, engine efficiency and stability. Efficiency and performance of the gas turbine engine are optimized because first, there is no performance penalty since the bled flow is used for cooling the turbine components and second, tip clearance flow is reduced, thereby reducing interference between the pressure side flow and the suction side flow. Moreover, engine stability is improved since tip leakage ceases to be sufficiently strong to cause a surge. Therefore, the present invention improves not only the efficiency and performance of the gas turbine engine, but also the stability thereof.

The foregoing and other advantages of the present invention become more apparent in light of the following detailed description of the exemplary embodiments thereof, as illustrated in the accompanying drawings.

DETAILED DESCRIPTION OF THE INVENTION

Figure 1:
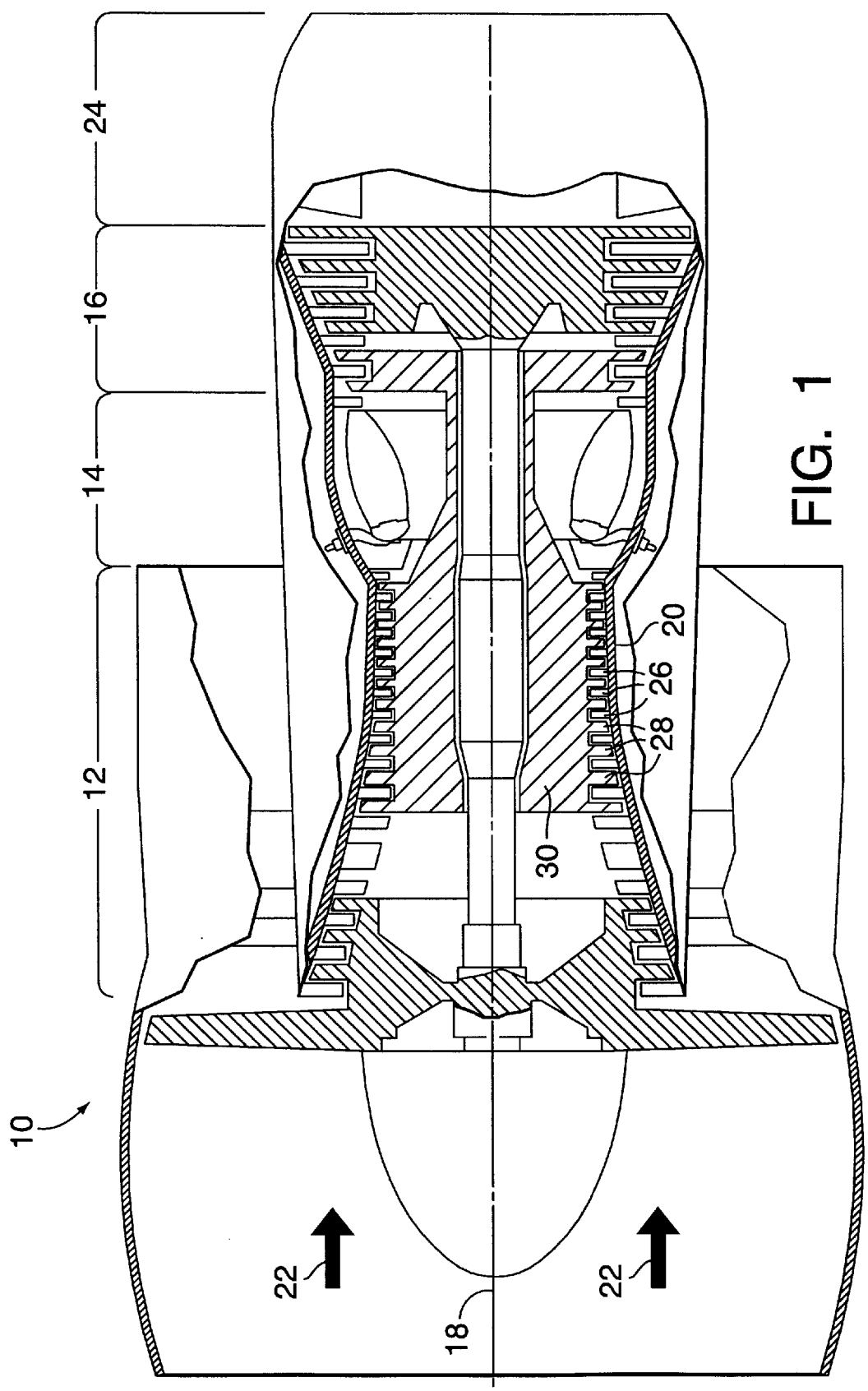
FIG. 1 is a simplified, partially broken away representation of a gas turbine engine.

Referring to FIG. 1, a gas turbine engine 10 includes a compressor 12, a combustor 14, and a turbine 16 sequentially situated about a longitudinal axis. 18. An engine case, or an outer shroud, 20 encloses sections 12, 14, 16 of the gas turbine engine 10. Air flows along an annular air path 22 through the sections 12, 14, 16 of the gas turbine engine 10 and is exhausted through an aft portion 24 of the gas turbine engine 10. The compressor 12 and the turbine 16 include alternating rows or stages of stationary vanes 26 and rotating blades 28. The stationary vane stages 26 are mounted onto the engine case 20. The rotating blade stages 28 are secured onto a rotor 30.

Figure 2:
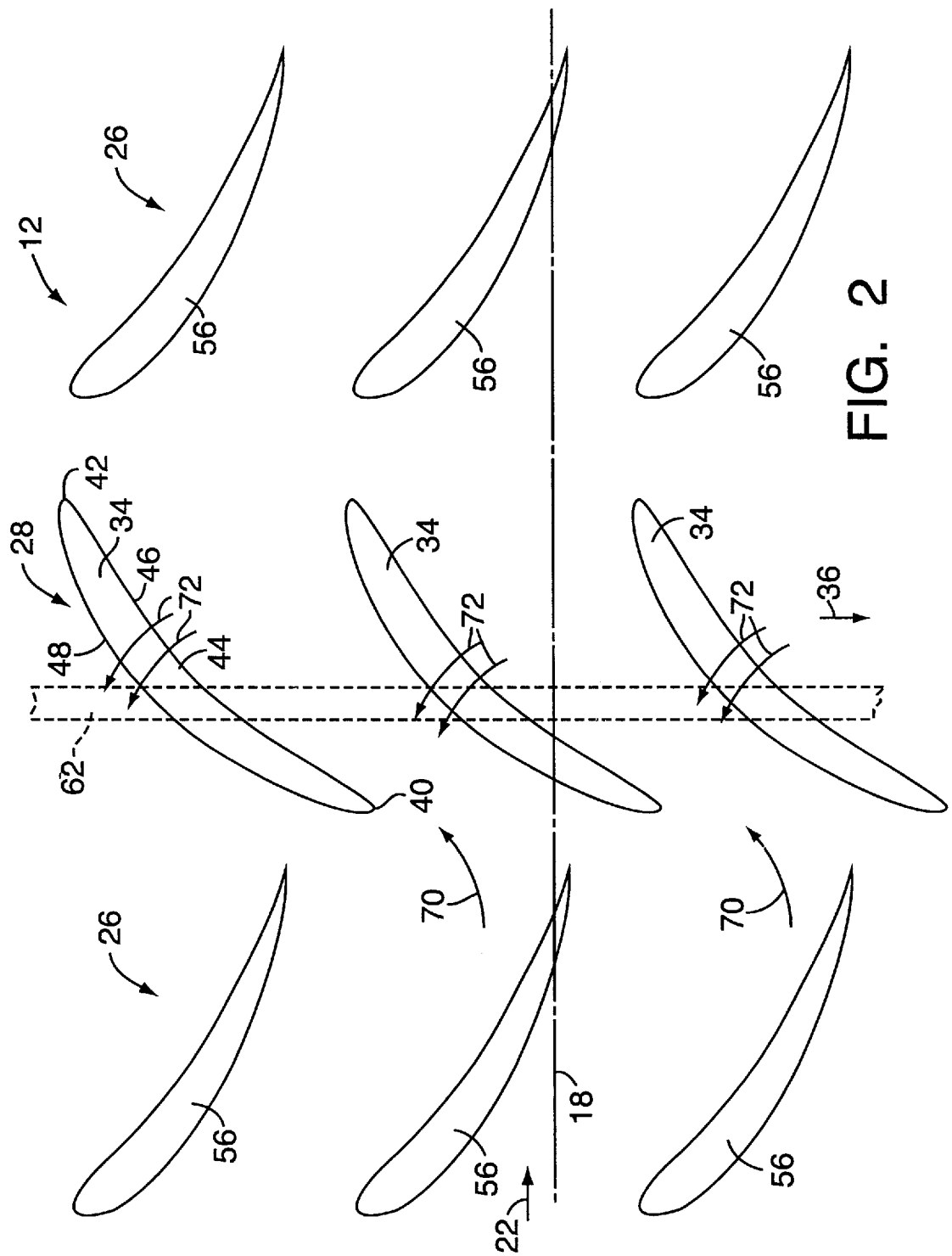
FIG. 2 is an enlarged, fragmentary, top schematic representation of a compressor section of the gas turbine engine of FIG. 1 having alternating stages of rotating blades and stationary vanes.
Figure 3:
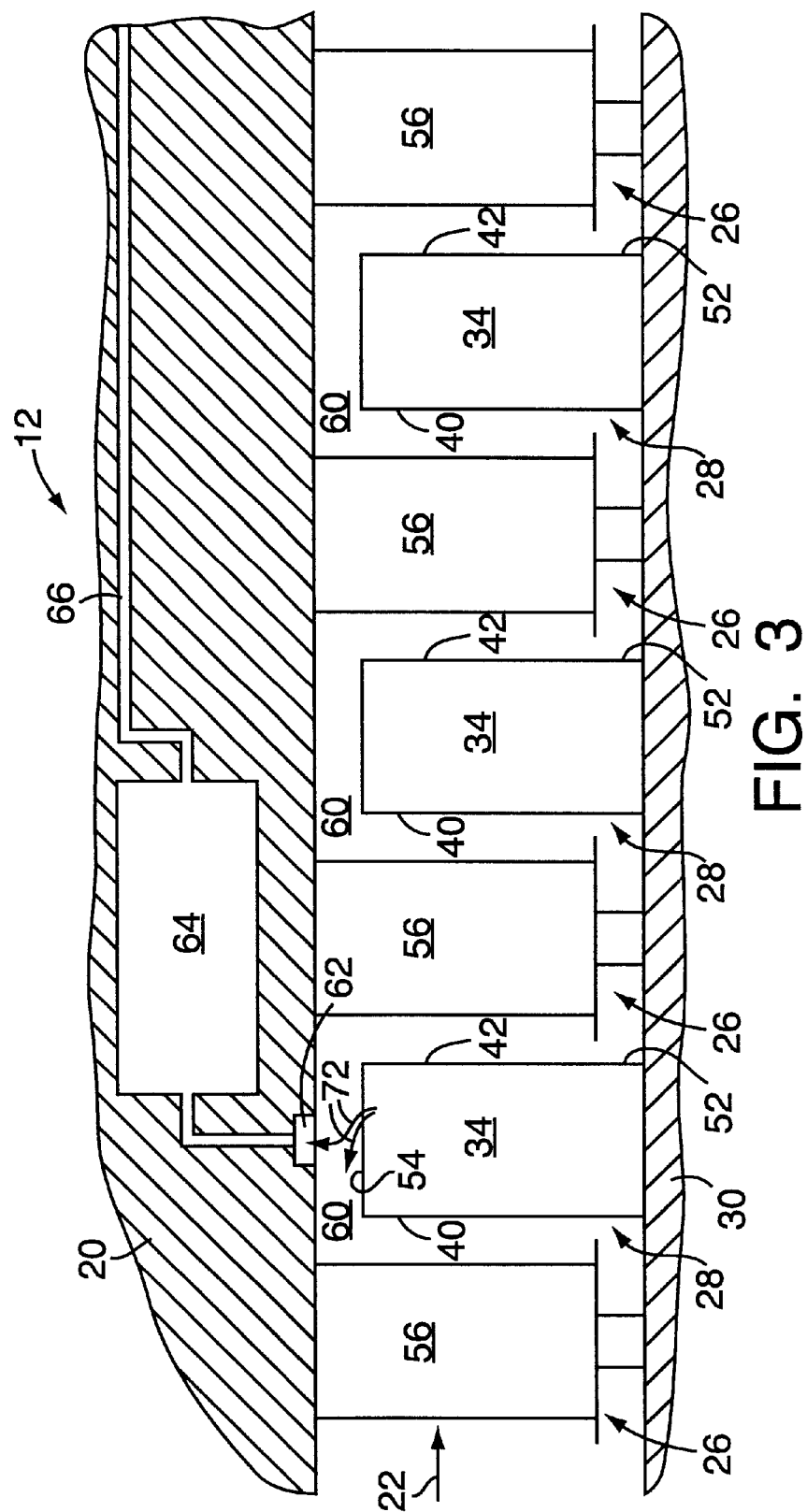
FIG. 3 is a side schematic representation of the alternating rows of rotating blades and stationary vanes of FIG. 2 with a rotor tip bleed groove, according to the present invention.

Referring to FIG. 2, each rotating blade row or stage 28 includes a plurality of blades 34 that are simultaneously rotated in a direction of rotation, designated by an arrow 36. Each blade 34 includes a leading edge 40 and a trailing edge 42 with a mid-cord section 44 disposed therebetween. Each blade 34 also includes a pressure side 46 and a suction side 48 that extend from a root 52 to a tip 54 of the blade 34, as best seen in FIG. 3. Each stationary vane row or stage 26 includes a plurality of vanes 56 oriented to redirect air flow for the next stage 28 of the rotating blades 34.

Referring to FIG. 3, a tip clearance 60 is defined between blade tips 54 and the engine case 20. A substantially annular groove 62 is formed within the engine case 20 above the stage 28 of the rotating blades 34. The groove 62 communicates with a plenum 64 formed within the engine case 20. The plenum 62 communicates with the turbine section 16 of the gas turbine engine 10 through a channeling pipe 66, also formed within the engine case 20.

During operation of the gas turbine engine 10, the incoming air 22 is compressed in the compressor 12, ignited and burned in the combustor 14 with the hot products of combustion entering and expanding in the turbine 16, as best seen in FIG. 1. As the air 22 enters the compressor 12, each stage of rotating blades performs work on the incoming air, thereby compressing the air. The air pressure on the pressure side 46 of each blade 34 is higher than the air pressure on the suction side 48, as best seen in FIG. 2. As the air is worked on by a particular stage 28 of blades 34, the pressure and temperature of the air is increased. The higher pressure and temperature air then passes through a stage 26 of stationary vanes 56. The vanes 56 redirect the air flow for the following stage 28 of the rotating blades 34, as indicated by arrow 70, and increase static pressure of the airflow.

As each stage 28 of the blades 34 performs work on the incoming air 70, tip leakage 72 occurs through the tip clearance 60 of each blade 34, as best seen in FIGS. 2 and 3. Tip clearance flow 72 passes from the pressure side 46 of each blade 34 to the suction side 48 thereof. As the tip clearance flow 72 attempts to flow to the suction side 48, a portion of the tip clearance flow 72 is extracted into the groove 62. Thus, only a portion of the tip clearance flow 72 actually passes to the suction side 48 of the blade 34. This diversion of a portion of the tip clearance, flow reduces the amount and strength of the tip clearance flow 72 that actually passes to the suction side 48 of the blade 34.

Referring to FIG. 3, the extracted tip flow from the groove 62 flows into the plenum 64 and then through the channeling pipe 66 into the turbine section 16 of the gas turbine engine 10, because the pressure of the tip leakage flow is sufficiently higher than the pressure of the air in the turbine section 16.

The benefits of the present invention are two-fold. First, no work is; lost since the diverted tip leakage flow 72 is used for cooling turbine components, which is necessary for the functionality of the gas turbine engine 10. Second, the present invention reduces tip leakage flow 72 that passes to the suction side 48 of the blades 34, thereby increasing both engine stability and efficiency. A significant reduction of tip leakage flow occurs when a portion thereof is extracted and drawn into the turbine section 16 of the gas turbine engine 10 via the groove 62, plenum 64, and channeling pipe 66. The extracted tip leakage flow is no longer available to pass to the suction side 48 of the blades 34 to mix and interfere with the suction side air flow. This reduction in interference between the suction side, flow and the tip leakage flow minimizing mixing losses, thereby increasing engine efficiency. Also, the reduction and tip leakage flow 72 reduces the potential for an engine surge, since the reduced tip leakage flow 72 is not sufficiently strong to cause reversal of the compressor flow and trigger the surge. Therefore, the present invention not only increases the efficiency of the gas turbine engine but also increases the stability thereof. Even the bled tip leakage flow is not wasted, because it is used for cooling the turbine section components.

Figure 4:
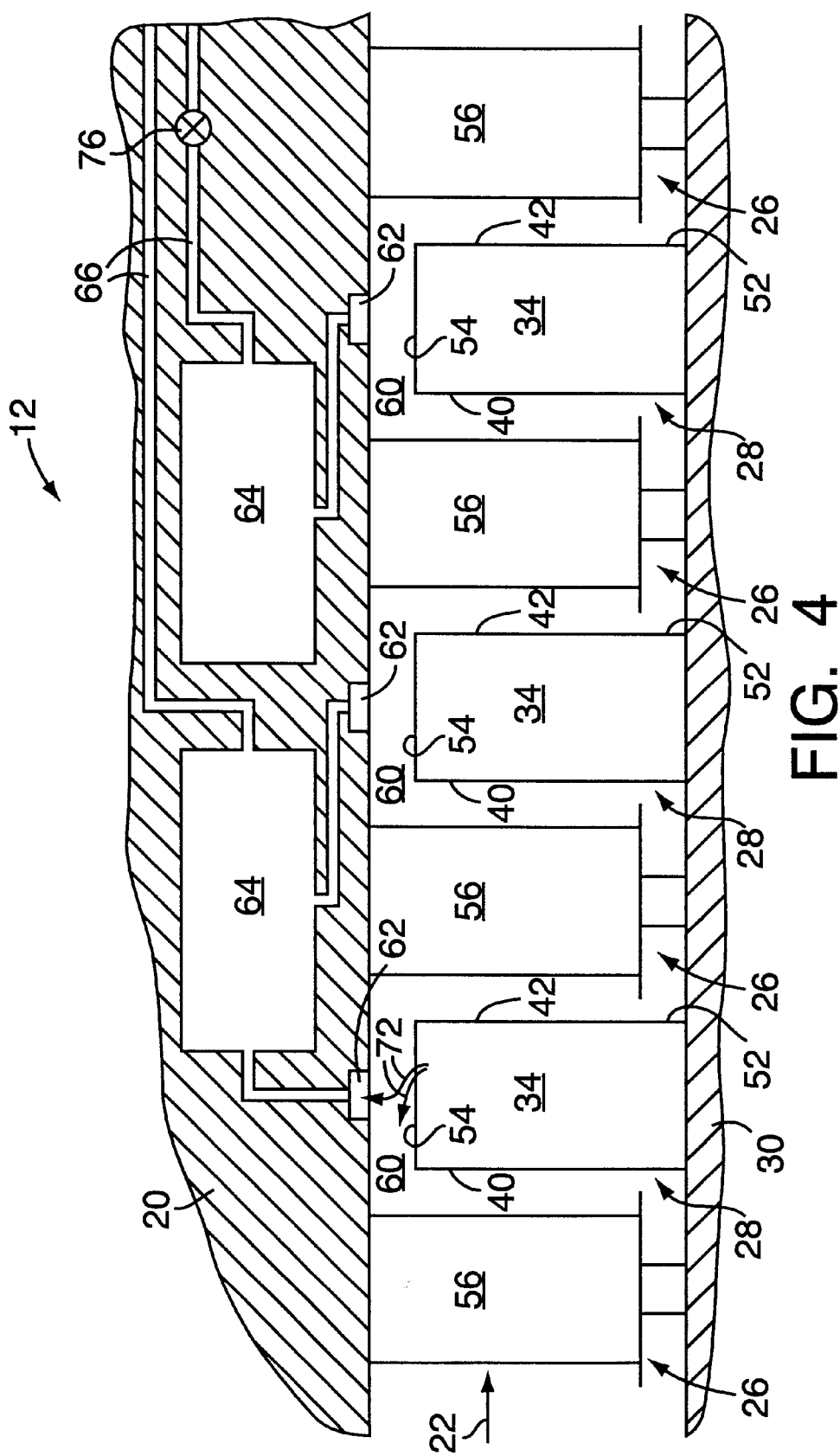
FIG. 4 is a side schematic representation of the alternating rows of rotating blades and stationary vanes of FIG. 2 with multiple rotor tip bleed grooves, according to an alternate embodiment of the present invention.

Referring to FIG. 4, in an alternate embodiment of the present invention, multiple stages 28 of rotating blades 34 include tip leakage grooves 62 that extract the tip leakage flow for use in cooling turbine section components. The tip leakage flow can be diverted into a single plenum 64 or multiple plenums 64. Additionally, cooling air for the turbine section 16 of the gas turbine engine can be modulated with a valve 76 to vary amount of cooling air supplied to the turbine section 16.

Figure 5:
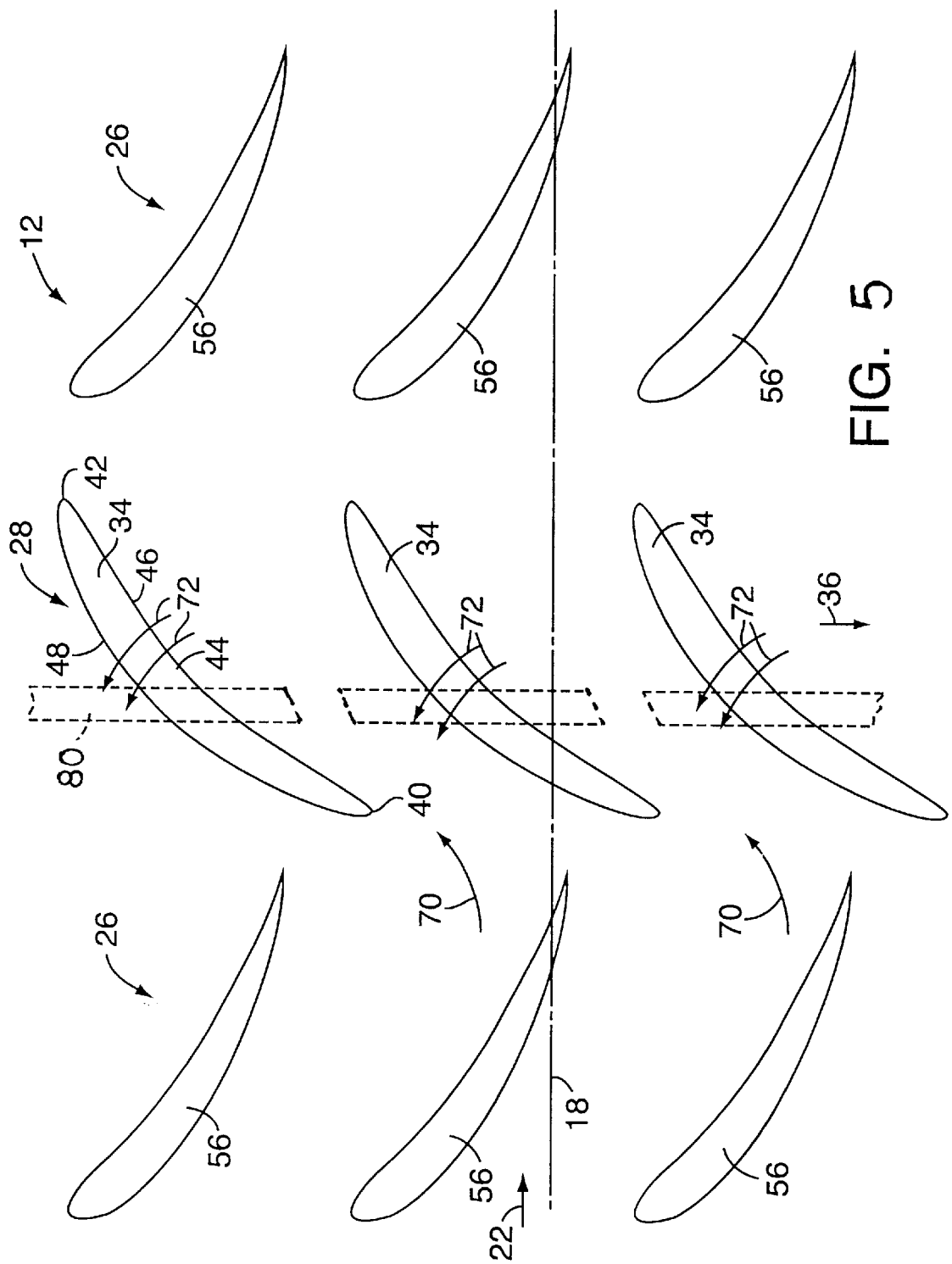
FIG. 5 is a top schematic representation of the compressor section of FIG. 2 with an interrupted groove, according to an alternate embodiment of the present invention.

Rotor tip bleed can be used either as a separate bleeding scheme or in combination with conventional bleeding schemes. The precise location of the groove 62 with respect to the blade 34 depends on the specific configuration of the blades 34 and of the gas turbine engine 10. However, it is preferable to locate the groove 62 between the leading edge 40 and the mid-cord section 44 of the rotating blades 34, as best seen in FIG. 2. Although the preferred embodiment of the present invention describes a substantially circumferential groove 62 for extracting the tip leakage flow, an interrupted circumferential groove 80, as shown in FIG. 5, or a plurality of holes communicating with the plenum 64 is contemplated by this invention. Also, the tip leakage flow can be routed into the turbine section 16 by the channeling pipe 66 directly from the groove 62, without passing through the plenum 64.

While the present invention has been illustrated and described with respect to a particular embodiment thereof, it should be appreciated by those of ordinary skill in the art, that various modifications to this invention may be made without departing from the spirit and scope of the present invention.

I claim:

1. A gas turbine engine having a compressor section, a combustor section, and a turbine section enclosed in an engine case with an annular flow path extending axially therethrough, said compressor section having a plurality of rows of rotating blades alternating with a plurality of rows of stationary vanes, said gas turbine engine comprising:

a groove formed in said engine case of said compressor section and extending substantially circumferentially therethrough, said groove being substantially adjacent to one row of said plurality of rows of rotating blades, said groove being in fluid communication with said turbine section for channeling cooling air from said compressor section to said turbine section to increase stability of said gas turbine engine.

2. The gas turbine engine according to claim 1 further comprising:

a plenum formed in said engine case and being in communication with said groove and said turbine section.

3. The gas turbine engine according to claim 2 further comprising:

a channeling pipe formed in said engine case and being in communication with said plenum and routing said cooling air from said plenum to said turbine section of said gas turbine engine.

4. The gas turbine engine according to claim 1 further comprising:

a channeling pipe formed in said engine case and being in communication with said groove and routing said cooling air from said groove to said turbine section of said gas turbine engine.

5. The gas turbine engine according to claim 4 further comprising:

a valve cooperating with said channeling pipe to modulate amount of cooling air being diverted to said turbine section of said gas turbine engine.

6. The gas turbine engine according to claim 1 further comprising:

a second groove formed in said engine case of said compressor section and extending substantially circumferentially therethrough, said second groove being substantially adjacent to another row of said plurality of rows of rotating blades, said second groove being in fluid communication with said turbine section for channeling cooling air from said compressor section to said turbine section.

7. The gas turbine engine according to claim 1 wherein said groove is substantially annular.

8. The gas turbine engine according to claim 1 wherein said groove is circumferentially interrupted.

9. The gas turbine engine according to claim 1 wherein said groove includes a plurality of circumferentially interrupted grooves.

10. The gas turbine engine according to claim 1 wherein said groove is disposed between a leading edge and a mid-cord section of said rotating blades.

11. A gas turbine engine having a compressor section, a combustor section, and a turbine section with an annular flow path extending axially therethrough, said compressor section having a plurality of rows of rotating blades alternating with a plurality of rows of stationary vanes, each said row of rotating blades includes a plurality of blades, each said blade having a blade tip, said gas turbine engine comprising:

an outer shroud enclosing said compressor section, said outer shroud defining a tip clearance between said blade tips of said rotating blades and said outer shroud, said outer shroud defining a plurality of grooves, each of said plurality of grooves extending substantially circumferentially through said outer shroud, each of said plurality of grooves being substantially adjacent to one respective row of said plurality of rows of rotating blades, each of said plurality of grooves being in fluid communication with said turbine section for extracting air from said tip clearance of said respective row of rotating blades of said compressor section to be routed to said turbine section to increase stability of said gas turbine engine.

12. The gas turbine engine according to claim 11, further comprising:

a plenum formed in said outer shroud and being in communication with each of said plurality of grooves and said turbine section.

13. The gas turbine engine according to claim 12 further comprising:

a channeling pipe formed in said outer shroud and being in communication with said plenum and routing said cooling air from said plenum to said turbine section of said gas turbine engine.

14. The gas turbine engine according to claim 11 further comprising:

a plurality of channeling pipes formed in said outer shroud and being in communication with each of said plurality of grooves and routing said cooling air from each of said plurality of grooves to said turbine section of said gas turbine engine.

15. The gas turbine engine according to claim 11 further comprising a plurality of plenums formed in said outer shroud and being in with said plurality of grooves and said turbine section.

16. A gas turbine engine having a compressor section, a combustor section, and a turbine section with an annular flow path extending axially therethrough, said compressor section having a plurality of rows of rotating blades alternating with a plurality of rows of stationary vanes, said gas turbine engine comprising:

an engine case enclosing said compressor section and defining a groove, said groove extending substantially circumferentially through said engine case, said groove being disposed between a leading edge and a mid-cord section of one row of said plurality of rows of rotating blades, said groove being in fluid communication with said turbine section for channeling cooling air from said compressor section to said turbine section to reduce potential for an engine surge, thereby increasing stability of said gas turbine engine.

* * * * *

UNITED STATES PATENT AND TRADEMARK OFFICE
CERTIFICATE OF CORRECTION

PATENT NO.     : 6,574,965 B1
DATED          : June 10, 2003
INVENTOR(S)    : Matthew R. Feulner It is certified that error appears in the above-identified patent and that said Letters Patent is hereby corrected as shown below:

Column 6,
Line 42, -- communication -- should be inserted after "in".

Signed and Sealed this

Twenty-eighth Day of October, 2003

JAMES E. ROGAN
*Director of the United States Patent and Trademark Office*